Patented May 12, 1942

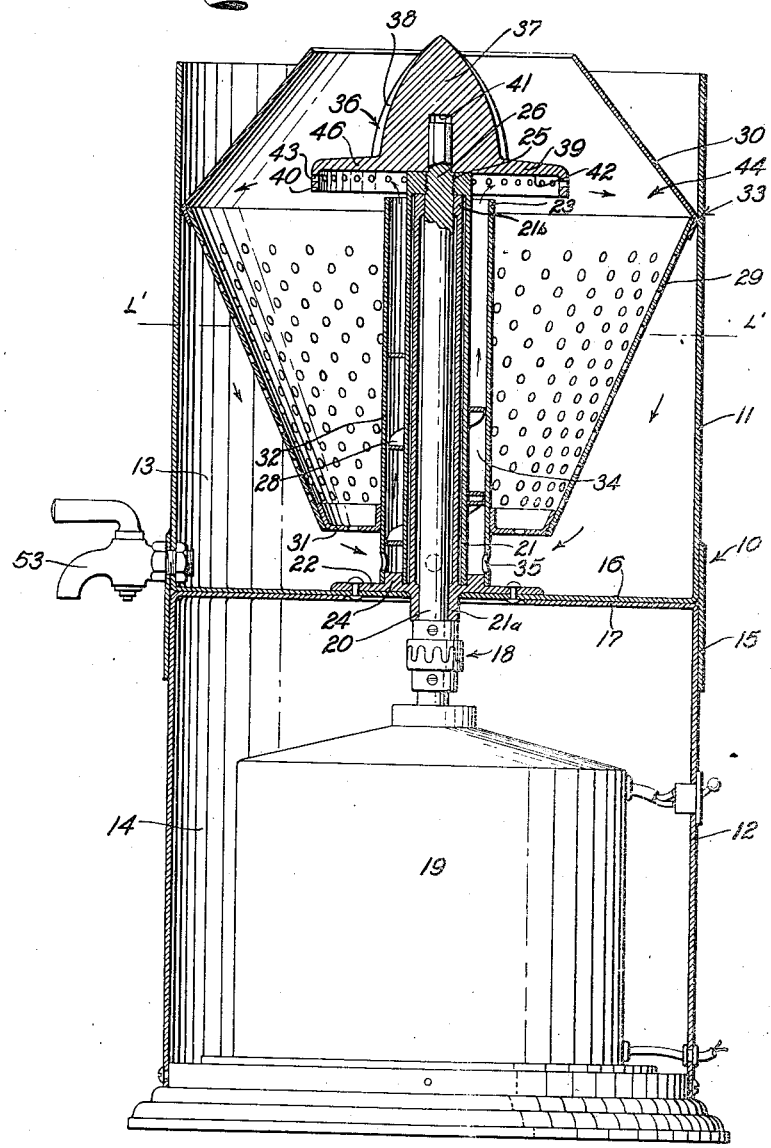

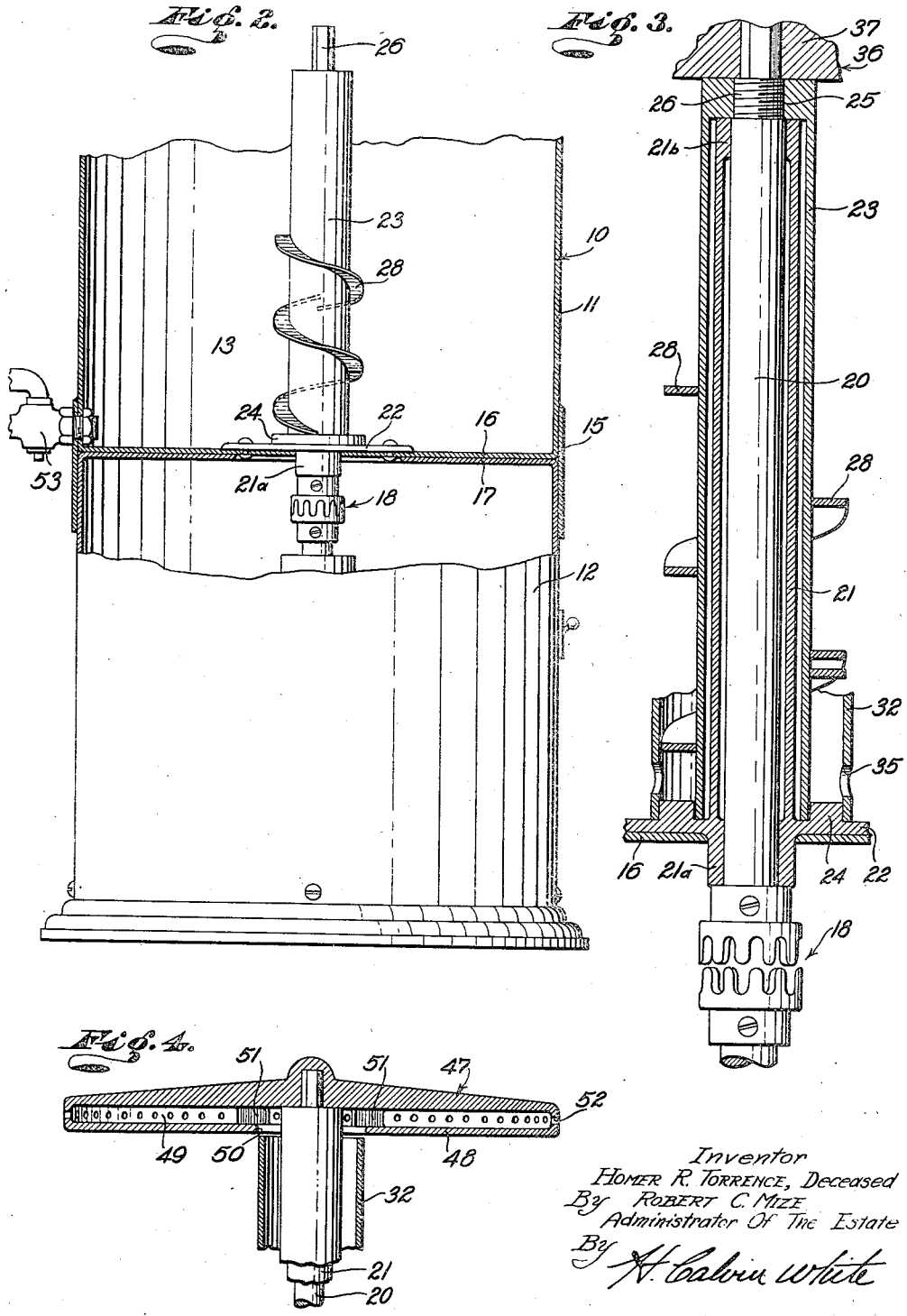

2,282,623

UNITED STATES PATENT OFFICE 2,282,623

APPARATUS FOR TREATING LIQUIDS

Homer Reid Torrence, deceased, late of South Laguna, Calif., by Robert C. Mize, administrator, Santa Ana, Calif., assignor to Gladys J. Torrence Original application May 1, 1939, Serial No. 271,113. Divided and this application October 2, 1939, Serial No. 297,476

10 Claims. (Cl. 259—97)

This invention relates generally to improved apparatus for aerating and removing absorbed gases from liquids, and particularly for blending different or separate liquids under conditions such that undesirable gaseous or odorous constituents of one or both of the liquids are effectively removed, and the liquids are so combined as to impart various desirable properties to the blended product. The present apparatus has been developed primarily for the treatment and refreshing of packaged fruit and vegetable juices and their concentrates, and will therefore be described with this particular, though typical, object in view. For a more detailed discussion of the desirability for refreshing such juices and concentrates, and the method by which this end is accomplished through aeration and blending of the juices, reference may be had to copending application Ser. No. 271,113 filed May 1, 1939, on Method for treating juices, of which the present application is a division.

Referring briefly to the normal condition of juices packaged for preservation by canning and other processes, the palatability and other desirable properties of the fresh juices are greatly impaired by heating or other treatment in the packaging process, and altered internal conditions of the juices. These packaged juices are characterized by their so-called "flat" taste, odors not possessed by the fresh juices, and a certain sliminess and lack of body due to changes brought about in the physical as well as chemical properties of the juices. By subjecting the juices to treatment in the present apparatus, the properties of the juices may be greatly improved and a product obtained that in taste and quality is far superior to the untreated packaged juice.

In accordance with the invention, means is provided for removing absorbed or dissolved gases and vapors contained in the packaged juices, and also for replacing such gases and vapors with air, for the purpose of to some extent giving the juice a refreshed taste and improving its physical properties, notably its body. In order to further restore the qualities of the fresh juice, the packaged product is treated to increase its air retaining capacity and to freshen its taste. This is done by combining with the packaged juice a suitable proportion of another or fresh juice, and subjecting the juices to intimate mixing and aeration. The fresh juice revives the taste of the packaged juice by absorption in the latter of the fresh aroma and bouquet, and also increases its air retaining capacity to a degree that the mixed product will absorb air and form and support bubbles like the fresh juice, and have an improved body that is of importance to the palatability of the juice.

In its preferred form, the apparatus comprises a rotating element, which may be referred to generally as a rotor, driven at high velocity and against which the juice to be aerated is directed so that the juice is projected centrifugally from the rotor in finely divided form within an open air space. Preferably, the rotor is mounted for rotation about a vertical axis, and the juice is forcibly projected upwardly from a body of the juice below the rotor, against the under surface of the latter. The rotor is provided with suitable means, such as a peripheral series of apertures, for dividing the liquid into a plurality of small streams and causing the liquid to be projected from the rotor in a state of fine division and intimate exposure to the air. After traversing the air space, the juice is projected against a solid surface so that the resulting impact serves further to deplete the liquid of any objectionable gaseous constituents. The liquid may then be returned to the body of juice referred to above, and repeatedly recirculated and projected against the rotor for such length of time as may be required for complete aeration and removal of gases.

While thus being treated as described, the packaged juice may be combined with a suitable proportion of the fresh juice, by directing the latter against the opposite or top surface of the rotor, so that the two juices are thrown outward to the periphery of the rotor where they are combined and admixed intimately and in a fine state of division, and are together subjected to aeration in being projected across the air space. The head of the rotor may conveniently carry a fruit reamer, as a means of expressing the juices from the fruit and immediately directing the juices against the outwardly extending top surface of the rotor, although it is to be understood that the invention broadly contemplates any suitable means for supplying and directing the fresh juices against the rotor surface. Being continuously operated, the apparatus subjects the two juices to continuous recirculation, admixing and aeration, until the proper proportion of fresh juice is added, and thereafter until the mixed juices reach a desired state of aeration and removal of impurities.

The invention possesses various additional objects and details, but these as well as the features referred to in the foregoing, will be understood to better advantage from the following description of the invention as embodied in certain typical and illustrative forms. Throughout the description reference is had to the accompanying drawings, in which:

Fig. 1 is a vertical sectional view of the apparatus;

Fig. 2 is a fragmentary view, partly in section, showing the reamer and screen assembly removed;

Fig. 3 is a fragmentary section of an enlargement of the impeller sleeve, seal tube and shaft assembly; and Fig. 4 is a view illustrating a variational feature of the invention.

Referring first to Fig. 1, the apparatus comprises an outer casing or shell generally indicated at 10, that includes upper and lower sections 11 and 12 forming respectively an upper juice containing compartment 13 and a lower motor compartment 14. In the normal assembled condition of the apparatus, an annular depending sleeve 15 on the upper section 11 is fitted down about the shell 12 so that the bottom 16 rests on the top wall 17 of the lower section. A clutch connection 18 between the motor 19 and shaft 20 permits the upper section 11 and its contained parts to be removed from the lower section 12, for cleaning or other purposes, or for replacement by a different upper section assembly. Shaft 20 extends vertically from the motor within a liquid seal tube 21 having an integral base flange 22 secured to the bottom 16 of section 11, the lowermost portion 21a of the tube below flange 22 forming a radial bearing for the shaft. The upper end of the tube bore may also be reduced in diameter to provide a bearing at 21b for the upper end of the shaft. The tube extends above the liquid in compartment 13 and thereby forms a seal preventing the flow of liquid downwardly along the shaft into the motor compartment 14. The shaft carries an impeller sleeve 23 extending downwardly about the tube 21 and journaled at its lower end within a boss 24 on the flange 22, the top of the sleeve being attached, as by screw threads 25 or other suitable connection, to the reduced diameter extension 26 of the shaft. The sleeve 23 carries a series of screw flights 28 which, during rotation of the sleeve through its connection 25 with the shaft 20, project the juice upwardly against the rotor, as will presently appear.

Compartment 13 contains a removable assembly comprising a frustro-conical screen 29 attached at its upper end to an imperforate frustroconical shell 30 of reverse angularity, and connected at its lower end through a perforated channel-shaped flange 31 with a tube 32 surrounding and annularly spaced from the impeller sleeve. The screen assembly is securely positioned by engagement at 33 with the shell 11, and by fitting the lower end of tube 32 about the boss 24 as illustrated. The tube 32 forms with the impeller sleeve an annular vertically extending passage 34 from which the juice is upwardly expelled by the pumping action of the screw flights 28, and into the bottom of which the juice is admitted through openings 35.

The shaft carries on its upper end a rotor, generally indicated at 36, which may conveniently take the form of a combination dispersing or atomizing disk and fruit reamer. Accordingly, in its preferred form, the element 36 consists of a reamer 37 having the usual surface ribs 38, and an integral circular base 39 carrying a depending flange 40. The reamer may be detachably secured to the shaft in any suitable manner, as by fitting the polygonal cross-section reamer bore 41 about the correspondingly shaped shaft extension 26. Vertical support is given the reamer by resting its flat bottom undersurface 42 on the upper end of the impeller sleeve 23. Flange 40 has a circular series of apertures 43 at rather closely spaced intervals, so that the juice passing through them will be divided into a plurality of small streams and uniformly reduced to a fine state of division.

In accordance with the present method, the apparatus is assembled as illustrated in Fig. 1, and compartment 13 is filled with a packaged juice, for example, canned orange juice, to some intermediate level as indicated by line L'. The motor 19 is then started into operation to rotate the shaft, impeller and reamer at a high rate of speed, for example between 2000 and 3000 R. P. M., or above. The impellers 28 discharge the juice upwardly within passage 34 and project it at high velocity against the under-surface 42 of the rotor. Initial removal of dissolved or absorbed gases and vapors from the juice occurs by virtue of the impact separating effect resulting from the juice being projected at high velocity against the surface 42. Then, due to its upward inertia under the influence of the impellers and the centrifugal force of the rotor, the juice is thrown rapidly outward along the under surface of the rotor to the apertures 43. In being required to pass through these apertures rotating at high speed, the juice is reduced to finely divided form, and is projected in such form centrifugally from the periphery of the rotor. It is desirable that flange 40 be given substantial thickness in order to insure thorough disintegration and atomization of the juice, which at least to a certain degree are enhanced by thickening the flange.

The juice being centrifugally thrown from the rotor into the air space at 44 is further and effectively separated from its contained gases and vapors, by reason of its fine state of division and intimate exposure to the air. At this point it may be mentioned that at their speed of rotation, ribs 38 on the reamer create a mild fan action, inducing upward circulation of air within the screen assembly, and expelling the released gases and vapors. Finally, the juice is subjected to further separating effect in being projected at high velocity across the air gap at 44 against the downwardly inclined imperforate wall 30. As will be understood, while the finely divided juice or mist is being dispersed into the space 44, it becomes thoroughly aerated and is thereby freshened in taste and improved in body by reason of the aeration. The continuous downward flow of juice from wall 30 washes any pulp or seeds down so that they accumulate in the lower portion of the screen, and the juice passes outwardly through the screen perforations for recirculation.

After removal of gases and vapors from the juice, or during such removal, a suitable proportion, around 20% to 25% being preferred, of fresh juice is added to the canned product, and desirably is combined therewith in a manner such that advantage is taken of the described treatment as a means for securing thorough blending and aeration of the admixed juices. Such combination of juices may be simply and effectively accomplished by expressing the added juice from the fresh fruit on the reamer 37. The fresh juice flowing outwardly over the top surface 46 of the rotor is itself to some extent atomized by the high speed of rotation and is thrown beyond the periphery of the rotor where the fresh juice meets and is intimately commingled with the atomized juice leaving the apertures 43. The two juices thus are most effectively blended and aerated together while in a finely divided state. The seeds and pulp removed from the fruit are collected within the screen 29, the juices passing down through the openings 35, all in the general path indicated by the arrows. This continuous circulation of the juice is maintained until the desired proportion of fresh juice is added, and the mixture is thoroughly aerated.

For certain purposes, it may be desirable to increase the size and capacity of the apparatus in such a way as to necessitate enlargement of the diameter of the rotor 36. In that event, the diameter may be enlarged beyond a distance through which the juice being projected against the under-surface of the rotor from passage 34, will adhere to or follow that surface out to the apertures 43. In accordance with the variational form of rotating element shown in Fig. 4, provision is made for retaining the juice within the element and positively projecting it outward through the apertures. Here the rotor 47 is substantially of disk form and comprises a lower integral wall 48 enclosing a space 49 into which the juice is projected from tube 32 through opening 50. Upon entering the space 49 the juice is thrown centrifugally and by the positive action of radial ribs or vanes 51, outwardly through the apertures 52. The reamer head is omitted in this variational form, to illustrate that if desired, the fresh juice may be previously extracted from the fruit and poured onto the top surface of the disk.

After blending and aeration of the juices as described, the reamer and screen assembly may be removed from the compartment 13, leaving the impeller sleeve and screw flight exposed as shown in Fig. 2. Between periodic withdrawals of the juice for service through cock 53, the impeller may be employed as an agitator to maintain the juices in uniformly mixed condition.

What is claimed is:

1. In apparatus of the character described, a vertically extending shaft, a circular rotor driven by said shaft, a fruit reamer on the top of said rotor, a liquid containing chamber below said rotor, means for driving said shaft and rotor at high velocity, and means forcibly projecting liquid from said chamber upwardly against the under surface of said rotor, the liquid thence being thrown centrifugally at high velocity from the rotor and aerated within an open space.

2. In apparatus of the character described, a shell enclosing a chamber containing a body of liquid, a shaft extending vertically within said chamber, a motor for driving said shaft, a circular rotor carried by the shaft above said body of liquid, means carried by the shaft for forcibly projecting liquid from said body upwardly against the under surface of said rotor, the liquid being thrown centrifugally and at high velocity laterally from the rotor across an air space between the rotor and said shell, and a strainer in said shell through which the liquid is recirculated to again be projected against the rotor.

3. In apparatus of the character described, a shell enclosing a chamber containing a body of liquid, a shaft extending vertically within said chamber, a motor compartment in said shell directly below said chamber, a shaft driving motor in said compartment and extending upwardly through the bottom of said chamber, a stationary tube extending up around the shaft from the bottom of said chamber to a point above the level of said liquid body, a second stationary tube surrounding and spaced from the first mentioned tube, a circular rotor carried by the shaft above said body of liquid, a fruit reamer on the top of said rotor, means carried by the shaft and rotating between said tubes to forcibly project liquid from said body upwardly against the under surface of said rotor, the liquid being thrown centrifugally and at high velocity laterally from the rotor across an air space between the rotor and said shell, and the liquid thence returning to said liquid body.

4. In apparatus of the character described, means forming a chamber containing a body of liquid, an element rotatable about a vertical axis and positioned above the liquid level in said chamber, means for rotating said element at high velocity, means for directing a stream of liquid against the top surface of said element, means forcibly projecting a stream of liquid from said body upwardly against the bottom surface of said element, a wall spaced from the periphery of the element, and means embodied in said element for finely dividing the liquid in said upwardly projected stream so that said stream is admixed and the liquids projected radially at high velocity from said element in finely divided form against said wall, and the admixed liquids then collected in said chamber.

5. In apparatus of the character described, an element rotatable about a vertical axis, a stationary tube below said element, a shaft extending upwardly within said tube and operating to rotate said element at high velocity, means carried by said shaft for projecting a stream of liquid from a level below said element upwardly against a downwardly facing surface of the element and at the point of contact with said element in direct exposure to an air space surrounding the element, means for directing a separate stream of liquid against an upwardly facing surface in said element, said streams being admixed and the liquids projected radially at high velocity from said element in finely divided form, and means for returning the admixed liquids to be directed through said tube upwardly against the bottom surface of said element.

6. In apparatus of the character described, a shell structure enclosing a chamber containing a body of liquid, a shaft extending vertically within said chamber, a motor compartment in said shell directly below said chamber, a shaft driving motor in said compartment and extending upwardly through the bottom of said chamber, a stationary tube extending up around the shaft from the bottom of said chamber to a point above the level of said liquid body, a circular rotor carried by the shaft above said body of liquid, an annular wall included in said shell structure and extending upwardly and inwardly about and in spaced relation to the rotor, means carried by the shaft outside said tube for forcibly projecting liquid from said body upwardly against a relatively small area of the under surface of said rotor and at a velocity such that the liquid is caused to adhere to said surface and to be thrown centrifugally along the surface and at high velocity from the rotor across an air space directly against the surface of the shell above said body of liquid, the liquid thence returning to said body of liquid.

7. In apparatus of the character described, a shell enclosing a chamber containing a body of liquid, a shaft extending vertically within said chamber, a motor compartment in said shell directly below said chamber, a shaft driving motor in said compartment and extending upwardly through the bottom of said chamber, a stationary tube extending up around the shaft from the bottom of said chamber to a point above the level of said liquid body, a second stationary tube surrounding and spaced from the first mentioned tube, a circular rotor carried by the shaft above said body of liquid and having a series of peripheral apertures, means carried by the shaft and rotating between said tubes to forcibly project liquid from said body upwardly against the under surface of said rotor and at a velocity such that the liquid is caused to adhere to said surface and to be thrown centrifugally along said surface, then through said apertures, and projected from the rotor across an air space directly against the surface of the shell above said body of liquid, the liquid thence returning to said body of liquid.

8. In apparatus of the character described, a shell enclosing a chamber containing a body of liquid, a shaft extending vertically within said chamber, a motor for driving said shaft, a circular rotor carried by the shaft above said body of liquid, means carried by the shaft for forcibly projecting liquid from said body upwardly against a relatively small area of the under surface of said rotor at a point in exposure to an air space about the rotor, the velocity of said upwardly projected liquid being sufficiently high to cause the liquid to adhere to said surface and to be thrown centrifugally along the surface through a series of small apertures in the periphery of said rotor, the liquid then being projected from the rotor across said air space directly against said shell above said body of liquid, and the liquid thence returning to said body of liquid.

9. In apparatus of the character described, means forming a chamber containing a body of liquid, a rotor above the liquid level in said chamber and turning about a vertical axis, means for rotating said rotor at high velocity, means forcibly projecting a stream of liquid from said body upwardly in contact with the bottom surface of said rotor near its center and at a velocity such that the liquid is caused to adhere to said surface and to be centrifugally projected along and in finely divided form beyond said surface into an air space surrounding the rotor, and means for directing a separate stream of a different liquid against the top of said rotor, whereby the streams are intimately admixed at the periphery of the rotor and centrifugally projected from said rotor at high velocity into said air space and then collected in said chamber.

10. In apparatus of the character described, an element rotatable about a vertical axis, a stationary tube below said element, a shaft extending upwardly within said tube and operating to rotate said element at high velocity, means carried by said shaft for projecting liquid from a level below said element upwardly against the bottom surface of said element near the center thereof and in direct exposure to an air space surrounding the element, the liquid being projected against said element at such high velocity as to cause the liquid to adhere to said surface and to be thrown centrifugally along the surface through apertures in the periphery of said element, the liquid thence being projected radially and at high velocity from said element in finely divided form into said air space, and then returned to said tube to again be projected against said element.

ROBERT C. MIZE.
*Administrator of the Estate of Homer Reid Torrence, Deceased.*